United States Patent Office 3,755,564
Patented Aug. 28, 1973

3,755,564
SYNERGISTIC INSECTICIDAL COMPOSITION OF DIAZINON AND A CERTAIN CARBAMATE
Kurt Gubler, Riehen, Switzerland, assignor to Ciba-Geigy Corporation, Ardsley, N.Y.
No Drawing. Continuation-in-part of application Ser. No. 803,090, Feb. 27, 1969. This application Nov. 15, 1971, Ser. No. 199,017
Claims priority, application Switzerland, Mar. 7, 1968, 3,410/68
Int. Cl. A01n 9/22, 9/36
U.S. Cl. 424—200        4 Claims

ABSTRACT OF THE DISCLOSURE

Insecticidal compositions which are synergistic insecticidal mixtures of O,O-diethyl-O-(2-isopropyl-6-methyl-pyrimidyl-(4))-thiophosphate, known under the trade name of Diazinon® with the carbamate of the formula

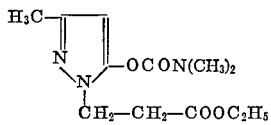

are described as well as methods for combatting insects using these compositions.

CROSS REFERENCE TO RELATED APPLICATIONS

This application is a continuation-in-part of patent application Ser. No. 803,090 filed Feb. 27, 1969, now abandoned.

DISCLOSURE

The present invention concerns insecticidal compositions, which constitute synergistic mixtures of O,O-diethyl-O-[2-isopropyl - 6 - methyl-pyrimidinyl-(4)]-thiophosphate—known under the name of Diazinon® (see British Pat. No. 713,278 or U.S. Pats. No. 2,754,243, 2,754,244 and 2,754,302) with heterocyclic carbamates known from the British Pat. 1,031,490 or the U.S. Pat. 3,342,832 and processes for the controlling of insects using the synergistic mixtures.

The term "synergistic mixture" denotes compositions of two or more insecticidally effective compounds, the action of which, in intensity or breadth, exceeds the sum to be anticipated from the actions of the individual components. The synergistic action of such a combination, especially in the case of compounds of varying chemical constitution, is not governed by any rules whatsoever and is not predictable.

It has now been found that mixtures of Diazinon® (O,O-diethyl - O - [2-isopropyl-6-methyl-pyrimidinyl-(4)-thiophosphate) with the heterocyclic carbamate of the formula

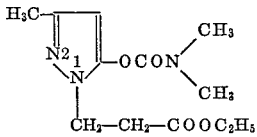

possess an appreciably higher insecticidal action than can be expected from the summation of the individual actions. This synergism is shown to a varying degree within a wide range of all possible mixture ratios. The relative amounts of the active substances are not critical. Mixtures may contain Diazinon and carbamate in proportions of 1:1 to 5:1, preferred however is the proportion 2:1.

In applying an insecticide, the occurring toxic residues on the crops, which are conveyed to the human or animal food, prevent in many cases the application of unlimited amounts of active substances. However, a limitation of the applied amount of active substances can lead to a reduction of the extent of destruction of the pests, which even if only slight, makes the value of a treatment practically ineffective. Thus for example, a destruction effect below 95% in the case of the olive fly is inadequate in practice, since the loss of crops is too high and the survival level of the pests is sufficient for the formation of an appreciably identical, succeeding generation. It is therefore of decisive importance if, by virtue of the addition of a synergist, the effectiveness of a compound can be increased to the extent that the desired effect can be achieved with an applied amount, the level of which creates no residue problem, whereas using the individual components to attain the same effect, amounts would be necessary which would produce unacceptable residues.

The new synergistic mixtures are particularly suitable for controlling fruit flies on oil fruits. The control of these pests is generally effected using phosphorus ester insecticides. Due to the high affinity to the oil fruits, rapid penetration and accumulation in the fruits, there is the possibility of the formation of toxic, undesirable residues with the application of phosphorus esters in the usual concentrations required for the control of fruit flies. In the new synergistic mixtures, the phosphorus content is considerably reduced, so that the formation of toxic residues is practically eliminated with, at the same time, an increased insecticidal activity.

The synergistic mixtures, according to the invention, also constitute very good stomach and contact poisons and exhibit a very good lasting effect against biting and sucking insects at all stages of development.

Their quick-kill properties should be particularly emphasized, since speed of action is an essential property for an insecticide. The quick-kill properties of the instant synergistic mixtures are clearly superior to those of the components of the mixture when used above.

The new synergistic mixtures can for example be used against the families Muscidae, Stomoxidae, Culicidae and Trypetidae such as, e.g. the polyvalent resistant and normally sensitive common house flies (*Musca domestica*), stable flies (*Stomoxys calcitrans*) and mosquitoes (e.g. *Aedes aegypti, Culex fatigans, Anopheles stephensi*), fruit flies, e.g. olive fly (*Dacus oleae*), Mediterranean fruit fly (*Ceratitis capitata*), against the insects of the families Curculionidae, Bruchididae, Dermestidae, Tenebrionidae, Chrysomelidae, Tineidae, e.g. granary weevils (*Sitophilus granarius*), bean beetles (*Bruchidius obtectus*), larder beetles (*Dermestes vulpinus*), Attagenus and Anthrenus, yellow meal worms (*Tenebrio molitor*), Colorado potato beetles (*Leptinotarsa decemlineata*), clothes moths (*Tineola biselliella*), against insects of the families Pyralidae, e.g. Mediterranean flour moths, Blattidae, e.g. German cockroaches (*Phyllodromia germanica, Periplaneta americana, Blatta orientalis*), against insects of the family Locustidae, e.g. desert locusts (*Locusta migratoria*), against the families Noctuidae, Tortricidae and Yponomeutidae, e.g. *Prodenia litura*, ermine moth (*Yponomeuta malinella*) etc.

The following tests show the improved insecticidal action of the synergistic mixtures according to the invention. The individual components are used as comparative active substances. The mixtures were applied in the form of aqueous emulsions, which were obtained from a 40% emulsion concentrate of the following composition by diluting with water:

40 parts of active substance
4 parts of epichlorohydrin
2.5 parts of isooctylphenyl polyglycolether
2.5 parts of dodecyl benzene sulphonate-calcium salt
51 parts of xylol.

The following were used as active substances:

(A) 40 parts of Diazinon
(B) 40 parts of 1-(β-ethoxycarbonylethyl)-3-methylpyrazolyl-(5)-N,N-dimethyl carbamate
(C) 26.7 parts of Diazinon and
13.3 parts of 1-[β-ethoxycarbonylethyl)-3-methylpyrazolyl-(5)-N,N-dimethyl carbamate.

(1) Tests on larva of the olive fly (*Dacus oleae*)

Seven-year-old "Rrantoio" olive trees (2.3 m. high) with uniformly abundant fruit crop were treated in clear weather (calm, 24° C.) with aqueous emulsions (produced from the previously mentioned 40% emulsion concentrates), which contained 15 g. of insecticide active substance per 100 litres. At this point of time, 5% of the fruit had been attacked by the olive fly (deposit of eggs and larva). 2 trials of each test were made simultaneously and under the same conditions.

24–26 days after the treatment, 100 olives were picked from each tree (green) with punctures (deposit of eggs by the olive fly), but without the hatching holes of the larva in the pupa stage. The olives were then examined with respect to larva alive inside the fruit.

The figures given in the following table are the percentage figures of maggot-free (larvae-free) olives and are the average values taken from the 3 series of tests.

Active substance: Percent maggot-free olives
Diazinon (A) _____ 81.5
Carbamate (B) _____ 19.8
Mixture: Diazinon:Carbamate 2:1 (C) _____ 95.7

In this test the synergistic mixture shows a better insecticidal activity than the individual components. Also worthy of note is the long-lasting, good effect of the mixture C. It can moreover be shown that the individual components A and B do not produce the percentage value of at least 95% which is required in practice.

(2) Tests with *Aedes aegypti*

An aqueous emulsion of the insecticide active substance (produced from the previously mentioned 40% emulsion concentrate) was applied to a filter in a Petri dish in such a manner that the concentration of active substance was 15.384γ per square centimetre of filter paper in each case. After drying of the coating of active substance—17 hours after application—15 mosquitoes of the type *Aedes aegypti* were placed on the filter and the latter covered over. The following table shows the time in minutes required before all the insects were on their backs.

Active substance: Time, minutes
A _____ 84
B _____ 135
C _____ 57

This test shows that the synergistic mixture destroys mosquitoes in an appreciably shorter time than the individual components A and B.

(3) Tests on larvae of the cherry fly (*Rhagoletis cerasi*)

Cherry trees of the species "coeur de pigeon" standing in the Rhone valley near Bex (Switzerland) carrying almost ripe fruits were treated on July 2, 1968 with an aqueous spray emulsion (prepared from the previously mentioned 40% emulsion concentrate) in such a manner that for each branch having a surface of about 2 m.², 5 l. of spray emulsion were used. The spray emulsion contained 20 g. of active substance per 100 liter of water. The treatment of the cherries occurred at a moment, when the cherry fly larvae of different stades were already inside the fruits. Care was taken that branches with fruits of similar ripeness were chosen for the test, i.e. branches which were equally exposed to sunshine. For every test, several branches were sprayed at the same time under the same conditions.

The branches thus treated were harvested after 6 days and of each group of branches equally treated, 200 cherries were chosen for insection examination with respect to larvae dead and alive inside the fruits.

| Active substance | Concentration | Dead larvae of different stades 2–7 mm. | Live larvae of different stades 2–7 mm. |
|---|---|---|---|
| Diazinon (A) | 20 g./100 l | 37 | 63 |
| Carbamate (B) | 20 g./100 l | 46 | 42 |
| Mixture: Diazinon:carbamate 2:1(C) | 20 g./100 l | 161 | 0 |

This test indicates that the mixture Diazinon:carbamate 2:1 kills the larvae of the cherry fly inside the fruit more effectively than the individual components do.

The synergistic mixtures can be used on their own or together with other pesticidal active substances such as with other insecticides, acaricides, fungicides and nematocides. The amount of synergistic mixture which is to be applied can be varied within wide limits. The amount applied depends on the ratio of components, on the type of preparation, on the type of insects to be controlled, as well as on the desired control effect. Depending on the form of preparation, the insecticidal compositions can have a content of 0.1 to 90 parts by weight of the stated synergistic mixture. In general, the applied concentrations are between 0.05 and 20% relative to the active substance mixture.

All preparation forms normally used for the protection of plants and provisions can be produced from the synergistic mixtures. This is carried out in a manner known per se by the intimate mixing and grinding of the active substances with suitable carriers and, optionally, with the addition of dispersion agents or solvents which are inert to the active substances.

The following forms of preparation are mentioned:

Solid forms: dusts, sprinkling agents, granulates, such as coated granulates, impregnated granules and homogeneous granules.
Water dispersible concentrates of active substances: wettable powders, pastes, emulsions.
Liquid forms: solutions, aerosols.

To produce solid forms (dusts, sprinkling agents, granules), the active substances are mixed with carriers. Examples of carriers are, e.g. kaolin, talcum, bole, loess, chalk, limestone, ground limestone, Attaclay, dolomite, diatomaceous earth, precipitated silicic acid, alkaline earth silicates, sodium and potassium aluminium silicates (feldspar and mica), calcium and magnesium sulphates, magnesium oxide, milled plastics, fertilisers such as ammonium sulphate, ammonium phosphate, ammonium nitrate, urea, ground vegetable products, such as bran, bark dust, sawdust, ground nutshells, cellulose powder, residues of plant extractions, active charcoal etc. Each of these carriers can be used alone or admixed with each other.

The grain size of the carriers is, for dusts, advantageously up to about 0.1 mm., for sprinkling agents about 0.075 to 0.2 mm. and for granulates 0.2 mm. or more.

As a rule, the concentration of active substance in the solid preparations is from 0.5 to 80%. To these mixtures can also be added additives which stabilise the active substance and/or non-ionic, anionic and cationic surface active substances which, for example, improve the adhesion of the active substances on plants and parts thereof (glues, adhesives) and/or ensure a better wettability (wetting agents) and dispersibility (dispersing agents). Examples of such adhesives are as follows: olein-lime mixture, cellulose derivatives (methyl cellulose), carboxymethyl cellulose), hydroxyethyl glycol ethers of mono- and di-alkyl phenols having 1–15 ethylene oxide radicals per molecule and 8–9 carbon atoms in the alkyl radical, lignin sulphonic acids, their alkali and alkaline earth metal salts, polyethylene glycol ethers (Carboxwaxes), fatty alcohol polyethylene glycol ethers having 5–20 ethylene oxide radicals per molecule and 8–18 carbon atoms in the fatty alcohol part, condensation products of ethylene oxide/propylene oxide, polyvinyl pyrrolidones, polyvinyl alcohols, condensation products of urea/formaldehyde as well as latex products.

The concentrates of active substance which can be dispersed in water (wettable powders), pastes and emulsion concentrates, are agents which can be diluted with water to give any desired concentration. They consist of active substance, carrier, optionally additives which stabilise the active substance, surface active substances and anti-foaming agents and, optionally, solvents. The concentration of active substance in these agents is 5–80%.

Wettable powders and pastes are obtained by mixing and grinding the active substances with dispersing agents and pulverulent carriers in suitable devices until homogeneity is attained. Suitable carriers are, for example, those previously mentioned for solid preparations. It is advantageous in some cases to use mixtures of different carriers. Suitable dispersing agents are, e.g. condensation products of sulphonated naphthalene and sulphonated naphthalene derivatives with formaldehyde, condensation products of naphthalene or of naphthalene sulphonic acids with phenol and formaldehyde, also alkali, ammonium and alkaline earth metal salts of lignin sulphonic acid, also alkylaryl sulphonates, alkali and alkaline earth metal salts of dibutyl naphthalene sulphonic acid, fatty alcohol sulphates such as salts of sulphated hexadecanols, heptadecanols, octadecanols, and salts of sulphated fatty alcohol glycol ethers, the sodium salt of oleoyl ethionate, the sodium salt of oleoyl methyl tauride, ditertiary acetylene glycols, dialkyldilauryl ammonium chloride and fatty acid alkali and alkaline earth metal salts.

Examples of anti-foaming agents are: silicones, e.g. "Antifoam A" etc.

The active substances are so mixed, ground, sieved and strained with the above mentioned additives that the solid particle size in wettable powders does not exceed 0.02–0.04 mm. and in the case of pastes 0.003 mm. To produce emulsion concentrates and pastes, dispersing agents such as those stated in the previous sections, organic solvents and water are used. Examples of solvents are: alcohols, benzene, xylenes, toluene, dimethyl sulphoxide and mineral oil fractions boiling between 120 and 350° C. The solvents must have practically no smell, be not phytotoxic, inert to the active substances and not easily inflammable.

In addition, the compositions according to the invention can be used in the form of solutions. For this application, the active substances are dissolved in suitable organic solvents, mixtures of solvents or in water. Aliphatic and aromatic hydrocarbons, chlorinated derivatives thereof, alkyl naphthalene, on their own or mixed with each other, can be used as organic solvents. The solvents should contain the active substances within a concentration range of 1–20%.

The following forms of compositions according to the invention serve to illustrate the present invention. Where not otherwise expressly stated, the term "parts" denotes parts by weight.

DUSTS

The following substances are used for a 3% dust:

2 parts of Diazinon
1 part of 1-($\beta$-ethoxycarbonyl-ethyl)-3-methyl-pyrazolyl-(5)-N,N-dimethyl carbamate,
0.3 part of epichlorohydrin
96.7 parts of talcum 20 parts of talcum are impregnated with a mixture of Diazinon and epichlorohydrin and homogeneously mixed. To this mixture are added the remaining talcum together with the carbamate. The mixture is then finely ground in a dowelled disc mill. The obtained dust is especially suitable for controlling insects in the house, farm, silos and in food storage places.

GRANULATE

The following substances are used to produce a 6% granulate:

4 parts of Diazinon
2 parts of 1-($\beta$-ethoxycarbonyl-ethyl)-3-methyl-pyrazolyl-(5)-N,N-dimethyl carbamate
6 parts of calcium silicate
87.75 parts of ground limestone (grain size 0.4–0.8 mm.)
0.25 part of epichlorohydrin In suitable mixing apparatus, the Diazinon and epichlorohydrin are drawn onto the ground limestone, mixed with 4 parts of calcium silicate and subsequently ground with a preliminary mixture of the carbamate and calcium silicate. A granulate is obtained which can be used for ground treatment and anywhere where finely pulverised material cannot be used on account of the formation of dust.

WETTABLE POWDER

The following substances are used to produce a 30% wettable powder:

20 parts of Diazinon
10 parts of 1-($\beta$-ethoxycarbonyl-ethyl) - 3 - methyl-pyrazolyl-(5)-dimethyl carbamate
35 parts of diatomaceous earth
5 parts of magnesium carbonate
20 parts of kaolin
5 parts of oleyl-methyl-tauride-sodium salt
5 parts of lignin sulphonic acid-sodium salt From Diazinon, diatomaceous earth and magnesium carbonate a preliminary mixture is produced, into which the other substances are then mixed. A wettable powder is thus obtained which can be diluted with water to give suspensions of any desired concentration. These suspensions can be used to control biting and sucking insects in cultivated plantations such as fruit-free plantations.

SPRAYING AGENT

The following substances are used to produce a 4% spraying agent:

3 parts of Diazinon
1 part of 1-($\beta$-ethoxycarbonyl-ethyl)-3-methyl-pyrazolyl-(5)-N,N-dimethyl carbamate
10 parts of xylol
86 parts of petroleum This solution is exceptionally suitable for controlling flies and mosquitoes in dwellings, warehouses and slaughterhouses.

EMULSION CONCENTRATE

The following substances are used to produce a 40% emulsion concentrate:

27 parts of Diazinon
13 parts of 1-($\beta$-ethoxycarbonyl-ethyl) - 3 - methyl-pyrazolyl-(5)-N,N-dimethyl carbamate
51 parts of xylol or of a highly aromatic distillation product of petrol, having a boiling range of 160–210° C., a specific weight of from 0.870 to 0.899 and a content of aromatic substances of over 95%
4 parts of epichlorohydrin as stabilising agent and
5 parts of a mixture of emulsifiers, containing 20–30% of alkyl-aryl sulfonate and 80–70% of alkylaryl polyglycol ether The active substances are dissolved in the solvent and the stabilising agent and the emulsifier are then added while stirring, until a homogeneous solution is attained.

The emulsion concentrates form a finely dispersed milky mixture upon adding to water. After stirring for a short while in order to achieve a good distribution, the emulsion thus obtained can be sprayed onto the plants to be treated.

What I claim is:

1. An insecticidal, synergistic composition, comprising as active substances insecticidally effective amounts of O,O-diethyl-O-(2-isopropyl - 6 - methyl-pyrimidinyl-(4))-thiophosphate and the carbamate of the formula:

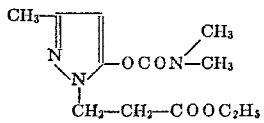

the ratio of phosphate to carbamate being 2:1.

2. The composition according to claim 1, also containing dispersing agent.

3. The composition according to claim 1, also containing a carrier.

4. The composition according to claim 2 wherein a carrier is also included.

References Cited

UNITED STATES PATENTS

| | | | |
|---|---|---|---|
| 2,754,302 | 7/1956 | Gysin et al. | 424—200 |
| 3,342,832 | 9/1967 | Gubler | 424—42 |

ALBERT T. MEYERS, Primary Examiner

V. D. TURNER, Assistant Examiner

U.S. Cl. X.R.

424—300